United States Patent
Chuang

[11] Patent Number: 6,003,151
[45] Date of Patent: Dec. 14, 1999

[54] ERROR CORRECTION AND DETECTION SYSTEM FOR MASS STORAGE CONTROLLER

[75] Inventor: Cheng-Te Chuang, Hsin-Chu, Taiwan

[73] Assignee: Mediatek Inc., Taipei, Taiwan

[21] Appl. No.: 08/823,423

[22] Filed: Mar. 24, 1997

Related U.S. Application Data

[60] Provisional application No. 60/037,157, Feb. 4, 1997.

[51] Int. Cl.$^6$ .......................... G06F 11/08; G06F 11/10; G06F 11/00; G08C 25/02
[52] U.S. Cl. ..................... 714/752; 714/746; 714/748; 714/781; 714/785; 714/48; 714/49; 714/54
[58] Field of Search ................................. 371/37.07, 37.1, 371/37.12, 37.01, 30; 369/32; 395/185.01, 185.02, 185.07

[56] References Cited

U.S. PATENT DOCUMENTS

| | | | |
|---|---|---|---|
| 4,413,340 | 11/1983 | Odaka et al. | 371/39 |
| 4,646,303 | 2/1987 | Narusawa et al. | 371/38 |
| 4,680,764 | 7/1987 | Suzuki et al. | 371/40 |
| 4,730,321 | 3/1988 | Machado | 371/38 |
| 4,802,152 | 1/1989 | Markvoort et al. | 369/32 |
| 5,241,546 | 8/1993 | Peterson et al. | 371/37.1 |
| 5,379,305 | 1/1995 | Weng | 371/41 |
| 5,563,896 | 10/1996 | Nakaguchi | 371/37.1 |
| 5,581,715 | 12/1996 | Verinsky et al. | 395/309 |
| 5,604,753 | 2/1997 | Bauer et al. | 371/40.1 |
| 5,617,384 | 4/1997 | Yonemitsu et al. | 369/32 |

OTHER PUBLICATIONS

Microsoft Press, Computer Dictionary, 3rd Edition, 1997, p. 104.

*Primary Examiner*—William Grant
*Assistant Examiner*—Iván Calcaño
*Attorney, Agent, or Firm*—Rabin & Champagne, P.C.

[57] ABSTRACT

Data read out from a mass storage unit are provided as a serial data stream in parallel to both a buffer memory and an error detection circuit. The read out data are stored within the buffer memory. At the same time, the error detection circuit performs an error detection operation on the serial data stream read out from the mass storage unit. The error detection operation consists of dividing a segment of the serial data stream corresponding to a data block by the error check polynomial and determining the remainder of the division operation. The remainder from this initial error division operation is stored. Error correction is then performed on the data stored in the buffer memory, for example using a Reed-Solomon code. When erroneous bytes are identified by the error correction circuitry, the error equations are solved to determine the error pattern and then the erroneous byte is overwritten in the buffer memory. The location of the erroneous byte within the serial data stream, along with the error pattern of the byte, are then used to calculate a correction to the remainder from the initial error division by the error check polynomial on the read in data stream. Error correction continues until the remainder is reduced to a zero value. At this point, it is assumed that all of the errors have been corrected and the data stored in the buffer memory is provided to the data bus of the host computer.

28 Claims, 6 Drawing Sheets

ERROR CORRECTION AND DETECTION SYSTEM FOR MASS STORAGE CONTROLLER

This application claims priority from U.S. provisional application Ser. No. 60/037,157, filed Feb. 4, 1997.

BACKGROUND OF THE INVENTION

1. Field of the Invention

The present invention relates to the transfer of data from mass storage devices to host computer systems. More particularly, the present invention relates to improved error processing that can be used to increase data transfer speeds from a mass storage device such as an optical disk read only memory to a data bus of a host personal computer.

2. Description of the Related Art

Optical mass storage devices such as compact disk read only memory (CD-ROM) devices are used for the storage and distribution of programs and data structures, particularly when the programs and data structures are too large to conveniently be distributed to users of personal computers or other small computer systems. CD-ROM devices and similar mass storage devices presently have considerably slower data access speeds than both integrated circuit memories and magnetic storage hard disk drives. Accordingly, conventional implementations of small computer systems limit the number of accesses made to optical mass storage devices. For example, program data are transferred from a CD-ROM storage disk to the magnetic hard disk of the small computer system to set up and configure the program. Once the program data are loaded onto the magnetic hard disk of the small computer, the optical disk drive is often not accessed in future uses of the program.

There are some programs that incorporate audio, video or other data structures which are not transferred to the magnetic hard disk for permanent storage; rather these data are accessed from the CD-ROM during program operation. Particularly for such programs, but also for other applications which use CD-ROM mass storage, there is a continuing desire to increase the speed at which data can be accessed from the CD-ROM and provided to the data buses of the computer system. Historically, the primary bottleneck for data transfer from the CD-ROM storage has been the speed at which data are read from the CD-ROM disk itself, rather than within the controller which formats the data, performs error correction and detection, and the other data transfer operations. To address this bottleneck, the speed at which CD-ROMs are rotated has been increased to many times the nominal rotation speed dictated by the CD-ROM standards. Thus, data are read from the CD-ROM disk at increased rates, to the extent that operations of the data transfer controller are now, or may soon be, limiting data transfer rates. Technologies which incorporate higher density data storage disks are being introduced and further improvements are under development which provide still higher data storage densities. Data are read out from these higher density mass storage systems at still higher rates, which will place still further demands on the data transfer controller.

Figure 1:
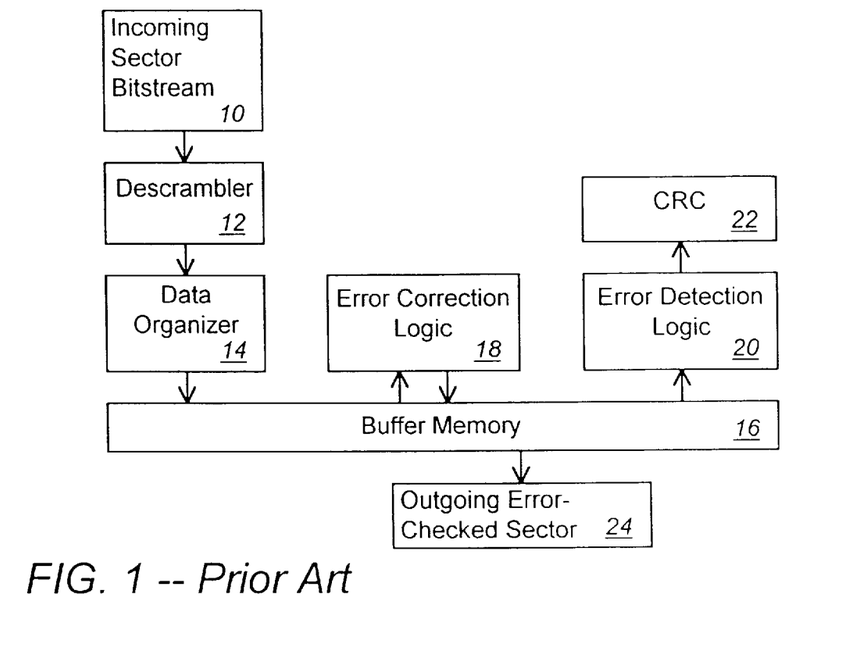
FIG. 1 illustrates a conventional implementation of a CD-ROM data transfer controller.

A variety of operations must be performed on the data read from the CD-ROM disk before the data can be provided to the data buses of the host computer system. These operations are generally familiar to those of ordinary skill in the art and include descrambling, reorganization, buffer storage, error correction and error detection. Further information regarding the conventional operations performed in the transfer of data from CD-ROM disk storage to a data bus of host computer system can be found in U.S. Pat. No. 4,680,764 to Suzuki, et al., in U.S. Pat. No. 4,802,152 to Markvoort, et al., and in U.S. Pat. No. 5,581,715 to Verinsky, et al., which patents are hereby incorporated by reference. FIG. 1 illustrates aspects of the CD-ROM controller described in the Verinsky patent, which might be used to control the transfer of data from a CD-ROM storage disk to the IDE bus of a host computer. Data are read from the CD-ROM disk by reflecting laser light from the surface of a rotating disk and detecting the modulations introduced into the reflected laser light from optical variations on the surface of the disk. An analog to digital converter converts the detected modulations into digital signals which are provided as a serial bitstream 10 for input to the CD-ROM controller. CD-ROM disks store data that are typically less random than is optimal, so that the data may inadvertently present synchronization signals or other control signals. Consequently, data stored on the CD-ROM disk are scrambled. Data extracted from the reflected light thus are provided to a descrambling circuit 12 and descrambled before further processing. Data organizer 14 reorganizes the descrambled serial data bitstream into bytes and stores the data into buffer memory 16. Data are stored on a CD-ROM disk in approximately 2 KB sectors and the data are transferred from the disk to the host computer sector by sector. An entire data sector is thus stored into the buffer memory before error correction and error detection begins.

Figure 2:
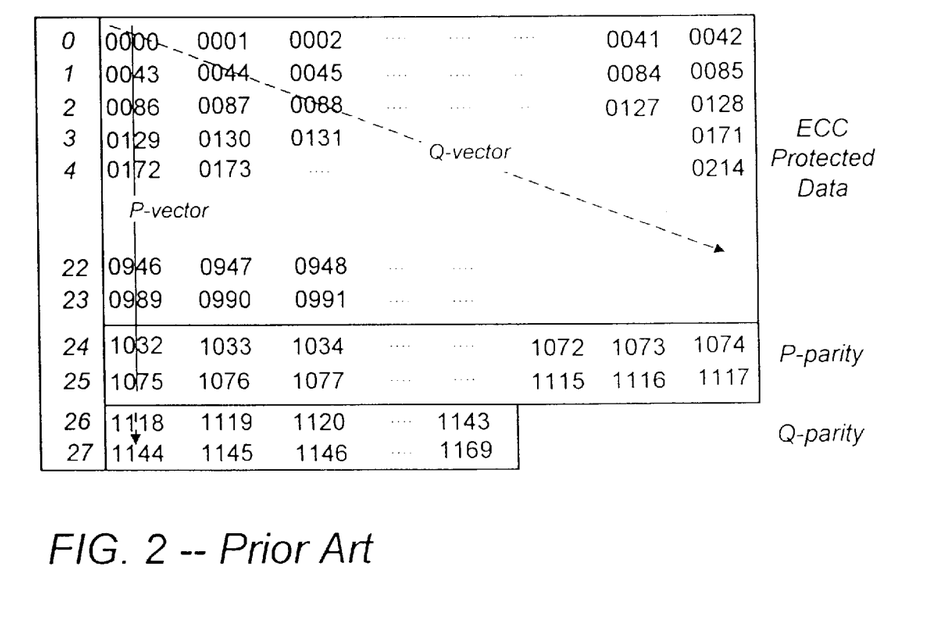
FIG. 2 illustrates the standard error correction matrix for data stored in CD-ROM mass storage disks.

Once a 2 KB sector of data from the CD-ROM disk is stored in the buffer memory 16, error correction and error detection are performed on the stored data. The error correction and error detection operations for CD-ROM mass storage systems are largely dictated by the ISO/IEC-10149 standard for storage of data on CD-ROM disks. Conventional error encoding, error correction and error detection operations for CD-ROM mass storage systems are described in U.S. Pat. No. 4,413,340 to Odaka, et al., and in U.S. Pat. No. 4,680,764 to Suzuki, et al., which are hereby incorporated by reference. Data integrity is maintained through the transfer of data from the CD-ROM to the host computer by three sets of error correction data appended to the user data within the sector: one hundred and seventy-two P-parity error correction bytes, one hundred and four Q-parity error correction bytes and four error detection code (EDC) bytes. Incorporation of the P-parity and Q-parity data provide a double interleaved Reed-Solomon code within the CD-ROM data. The data within the sector can be grouped into two planes of data, an LSB plane and an MSB plane, with each data plane having an interleaved error correction matrix like that shown in FIG. 2. The matrix shown in FIG. 2 has 43 P-vectors consisting of twenty-four bytes of user data in combination with two P-parity bytes to form (26, 24) Reed-Solomon codewords over $GF(2^8)$. Twenty-six Q-vectors extend along the diagonals of the matrix and consist of forty-three bytes of user data and two Q-parity bytes made up by (45, 43) Reed-Solomon codewords over $GF(2^8)$. Data are read from the buffer memory 16 (FIG. 1) in the form of P-vectors and Q-vectors, error correction calculations are performed by error correction logic 18 to identify errors in the data and, when errors are found, the error equations are solved to determine how to correct the error. When errors are found in the P-vectors and Q-vectors, the data in the buffer memory 16 are corrected by overwriting the erroneous data bytes in the buffer memory with corrected data bytes.

After all of the data correction operations are performed, it is conventional to then detect whether errors remain within the corrected data or whether errors have been introduced to the data by the correction operations. Error detection is performed using a cyclic redundancy checker (CRC), in which the entire data block (~2000 bytes×8 bits) is treated as a long binary number which is divided by an check polynomial. In accordance with the ISO/IEC-10149 standard, the error check polynomial is $P(x)=(x^{16}+x^{15}+x^2+1)\cdot(x^{16}+x^2+x+1)$. Data stored on the CD-ROM have four error detection code (EDC) bytes appended so that the long binary number comprising the data stored on the CD-ROM is evenly divisible by the error check polynomial. If the long binary number of the data transferred from the CD-ROM is evenly divisible by the error check polynomial, it is assumed that no further errors remain in the error check polynomial. If there is a non-zero remainder from the error check division, then errors remain in the corrected data, and further error correction is necessary. Alternately, the data may simply be reread from the CD-ROM and the error correction and detection process repeated. Typical hardware implementations of the error check division are simple, consisting of shift registers with feedback connections and an array of exclusive OR ($\oplus$) gates. Error detection requires that the entire data block be read from the buffer memory by the error detection logic 20 and serially shifted through the cyclic redundancy checker 22. So long as a zero remainder is produced by the error correction and error detection operations, the data may be transferred from the buffer memory 16 to the computer system data bus as an outgoing error checked sector 24.

Error correction and detection are time consuming aspects of data transfer from CD-ROM storage devices and computer data buses. Error correction of some kind, however, is necessary in reading data from an optical storage disk because of the nature of the data reading operation and the processing necessary to format the data appropriately for a digital computer. In addition, certain aspects of error correction are dictated by the industry standards for CD-ROM and other optical mass storage systems.

SUMMARY OF THE PREFERRED EMBODIMENTS

It is therefore an object of the present invention to provide an architecture for error correction of data read from a mass storage device that is capable of higher rates of data throughput.

An aspect of the present invention provides a method of transferring data between an optical disk mass storage system and a host computer. A data string is retrieved from the optical storage disk and converted to a form compatible with storage in a digital memory. The retrieved data string is stored within a buffer memory while the retrieved data string is provided to an error detection circuit. Error detection is performed on the retrieved data string to determine if errors exist within the retrieved data string, with at least a portion of the error detection operation performed while the retrieved data string is being stored into the buffer memory. The retrieved data string is transferred to the host computer system if the error detection operation determines that no errors are present in the retrieved data string. On the other hand, if the error detection operation determines that errors are present in the retrieved data string, then an error correction operation is performed on the retrieved data string prior to transferring the retrieved data string to the host computer.

Another aspect of the present invention provides a method of transferring data between an optical disk mass storage system and a host computer by retrieving a data string from the optical storage disk and storing the retrieved data string in a buffer memory. The retrieved data string is provided to a first error detection circuit and the first error detection circuit performs a first error detection operation on the retrieved data string to determine if errors exist within the retrieved data string and to determining a first error detection value characteristic of the errors present within the retrieved data string. An error correction operation is performed on the retrieved data string to identify a first error in the retrieved data string and determining an error pattern for the first error. The first error is then corrected in the retrieved data string and a second error detection operation is performed to determine if errors remain in the corrected data string.

In a preferred embodiment of this second aspect of the present invention, the step of performing a second error detection operation includes calculating a correction to the first error detection value on the basis of the error pattern determined for the first error.

DETAILED DESCRIPTION OF THE PREFERRED EMBODIMENTS

Preferred embodiments of the present invention provide higher speed error correction and error detection operations without compromising the levels of confidence in the data read out from the CD-ROM and provided to the host computer. These embodiments of the invention may be implemented while maintaining consistency with the industrial standards for CD-ROM storage devices. In accordance with one aspect of the present invention, data are read out from a mass storage unit and the serial data stream is provided in parallel to both a buffer memory and an error detection circuit. The error detection circuit, which might be a conventional cyclic redundancy checker, performs an error detection operation on the data read out from the mass storage unit, preferably as the data stream is being stored in the buffer memory. The error detection operation might, for example, consist of dividing the serial data stream that makes up a data block by the error check polynomial and determining the remainder of the division operation. If the error detection operation produces a result consistent with no errors being present in the data block, the data block stored in the buffer memory can be transferred directly to the data bus of the host computer system, without performing any data correction operations on the read out data.

This aspect of the present invention provides several advantages over the conventional error correction and error detection operations performed in conventional data transfer operations between CD-ROM storage devices and the data buses of host computer systems. The system can be configured so that data correction operations are only performed when there is reason to believe that there is a need to perform data correction. Elimination of unnecessary data correction operations increases the speed at which data can be transferred. There is, of course, a small probability that an erroneous data block could be evenly divisible by the check polynomial and it is conceivable that it might be desirable to not rely solely on the zero remainder produced by the error detection operation. In such a case, the data transfer system could perform data correction operations in the typical manner after a zero remainder were produced, but could keep track as to whether any data are corrected in the error correction operations. If no error corrections are performed after the initial error-free indication of the error detection operation, then the error detection operation would not be performed subsequent to the data correction operation. Even though error correction operations are performed in this variation, the error detection operation is still performed only during the initial read in of data from the mass storage system. Because the data need not be read out of the buffer memory and provided in serial form to the error detection circuitry subsequent to the error correction operation, this variation is still considerably faster than the conventional implementation of error correction and detection. In such embodiments, there is no need to wait for completion of the error detection operation before beginning the error correction operations. Accordingly, the error correction operations can be started immediately after data are stored in the buffer memory.

These aspects of the invention are highly advantageous for systems in which there are seldom errors in reading data from a CD-ROM storage disk, or in formatting the read out data for use by a digital computer system, or in providing the data to the data bus of the host computer system. Practical systems may experience considerably higher error rates, particularly as new technologies are introduced to optical storage systems. Optical disk storage systems which use higher density disks having finer data feature sizes, such as the digital versatile disk (DVD) system, may have an increased error rates. In addition, write once/read many ("WORM") and rewritable optical storage disks typically have information modulation schemes that are less robust than CD-ROM disks, so that systems using such new technology disks may also experience high error rates than are observed for CD-ROM storage disks.

Other aspects of the present invention find particular application in more realistic systems that experience errors in the course of reading data from mass storage systems. Certain embodiments of the invention read data out from a mass storage unit and provide the read out serial bitstream in parallel to both a buffer memory and an error detection circuit. The read out data are organized into bytes and stored within the buffer memory. At the same time, the error detection circuit performs an error detection operation on the serial data stream read out from the mass storage unit. Here again, the error detection operation might consist of dividing a segment of the serial data stream corresponding to a data block by the error check polynomial and determining the remainder of the division operation. The remainder from this initial error division operation is stored, in contrast to conventional EDC systems which discard the data. Error correction is then performed on the data stored in the buffer memory, for example using a Reed-Solomon product-like code, in the conventional manner. Here again, the error correction operations can be started once the data are assembled in the buffer memory, without waiting for completion of the error detection operation. When erroneous bytes are identified by the error correction circuitry, the error equations are solved to determine the corresponding error pattern and then the erroneous bytes are overwritten in the buffer memory. The locations of the erroneous bytes within the serial data stream, along with the error patterns of the bytes, are then used to calculate corrections to the EDC remainder from the initial error division by the error check polynomial on the read in data stream. The EDC remainder is corrected in accordance with the particular location and error pattern of each of the corrected bytes. The EDC remainder is tested after each erroneous byte is corrected to determine if the EDC remainder is non-zero and if the EDC remainder is non-zero, the EDC remainder is stored and error correction operations are continued. This operation is quite distinct from the conventional error correction scheme, which discards the error pattern and error location after erroneous bytes are corrected in the buffer memory. Error correction continues until the EDC remainder is reduced to a zero value. At this point, it is assumed that all of the errors have been corrected and the data stored in the buffer memory is provided to the data bus of the host computer. If the EDC remainder does not reach zero, the entire error correction process can be repeated on the once-corrected data in the buffer memory. More preferably, the data sector is read once again from the CD-ROM and the entire EDC and ECC process of the present invention are repeated.

As with the previously described embodiments, this aspect of the invention also provides higher data transmission rates because data are never read out of the buffer memory to be provided bit by bit to an error detection circuit. In addition, by halting error correction operations and transferring the data block after the error division remainder is reduced to zero, at least some unnecessary error correction operations are avoided, further improving the rate of data transfer. This specification now provides further detailed description of the present invention, beginning with a description of the general environment in which at least some preferred embodiments of the present invention are used.

Figure 3:
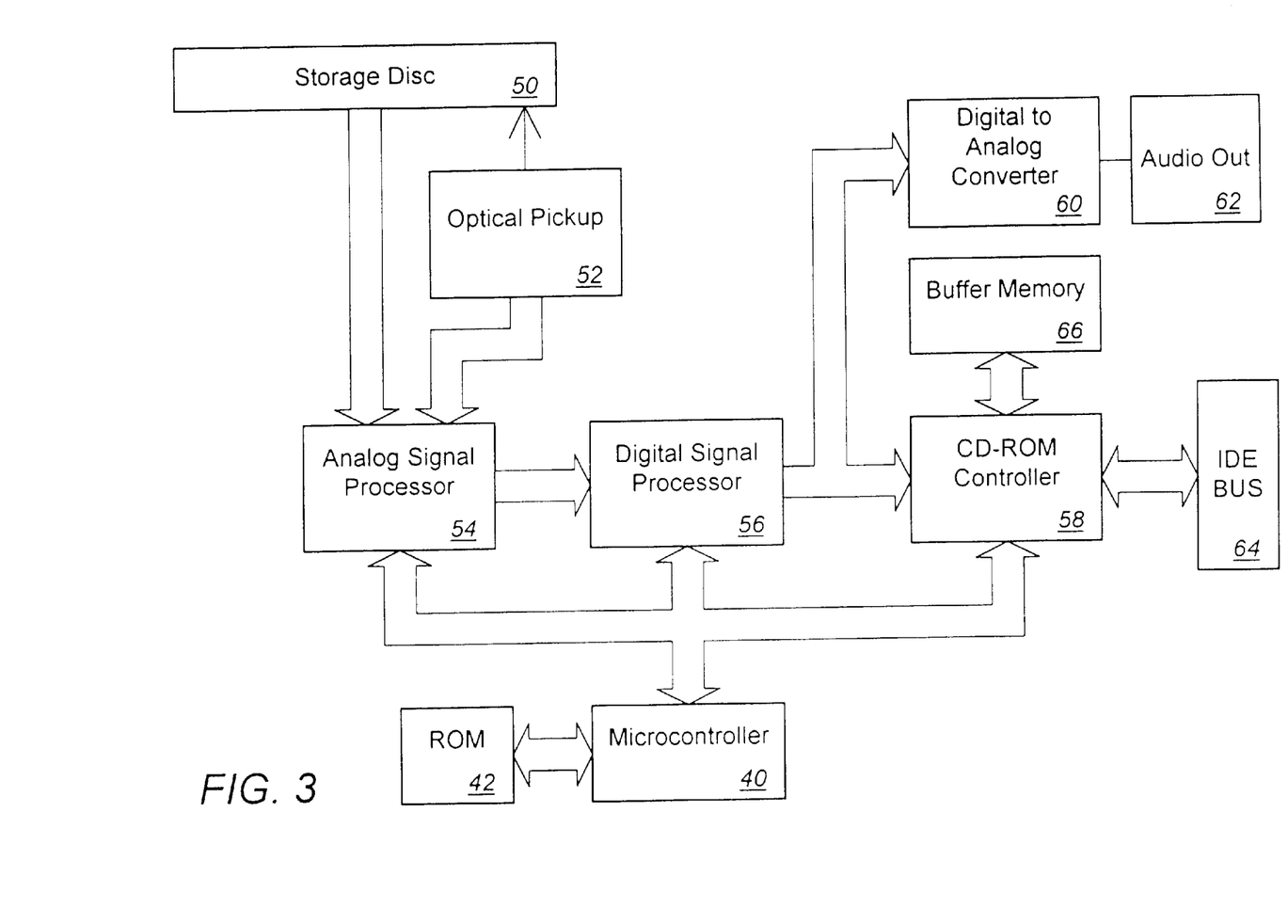
FIG. 3 illustrates an optical disk mass storage system in accordance with a preferred embodiment of the present invention.

FIG. 3 illustrates an optical disk mass storage system which may be a CD-ROM mass storage device. The illustrated data transfer system operates under control of a microcontroller 40, which may be of the 8051 type, operating in accordance with a control program stored in non-volatile memory 42. Information is stored optically on storage disk 50 in the form of raised or lowered regions on the surface of a reflective disk, or as local variations in the optical properties of the disk. Information is read from the disk by directing a laser beam from optical pickup 52 to the surface of the disk 50 and collecting the light reflected from the disk. A detector within the optical pickup 52 receives the reflected light and generates an analog electrical signal representing the stored information and provides that signal to the analog signal processor 54. Analog signal processor 54 receives the information signal from the optical pickup 52 and receives servo information from the spindle or motor that rotates that the storage disk 50. The analog signal processor processes the information signal and provides the information signal in an appropriate format to the digital signal processor 56. Digital signal processor 56 provides a digitized information signal at its output either to the CD-ROM controller 58 or to a digital to analog converter 60.

The digital to analog converter is capable of converting the digitized information signal from digital signal processor 56 to an analog signal. This analog signal is provided to the audio out jack 62, providing an audio output from the CD-ROM drive. The subsystem of the digital analog converter 60 and audio output 62 is typically provided in a small computer system to allow audio compact disks to be played, bypassing the digital data transfer circuitry of the CD-ROM controller. Data to be transferred to the data bus 64, which is illustrated as an IDE data bus, are passed through the CD-ROM controller 58 which operates in communication with a buffer memory 66 to format and perform error correction and error detection on the data before providing the data to the IDE bus 64.

FIG. 3 illustrates a mass storage system for retrieving data stored on CD-ROM disks. The organization of data within CD-ROM sectors is defined by the standard ISO/IEC-10149: Information Technology-Data Interchange on Read-Only 120 mm Optical Data Disks (CD-ROM). This standard dictates most of the structure of the data stored on the CD-ROM disk, but there are different permissible variations within this overall structure. There are three different modes of sectors within the standard, so that the data stored on the CD-ROM disk 50 of FIG. 3 could exist in any of the three modes: mode 0, mode 1, and mode 2. Accordingly, the FIG. 3 circuitry must be capable of accommodating the different data structures associated with the different modes in response to the mode data byte included within the CD-ROM data itself. This aspect of data transfer from CD-ROM devices is well known. The remaining discussion is set forth primarily in terms of the transfer of mode 1 data from a CD-ROM disk.

Figure 4:
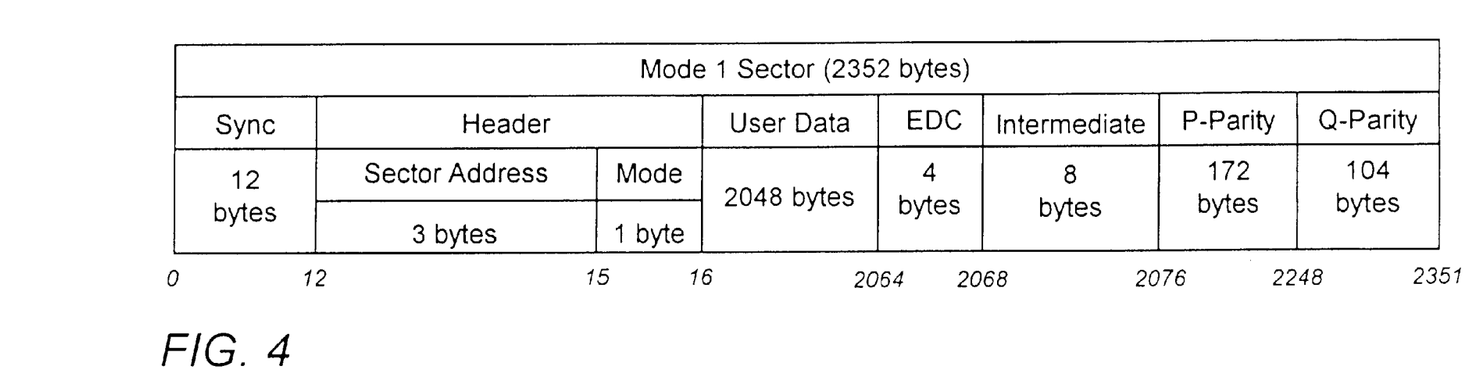
FIG. 4 illustrates the structure of data stored in one sector of a mode 1 CD-ROM disk.

FIG. 4 illustrates the structure of the data stored in a mode 1 sector as defined by the standard. The sector is subdivided into a number of fields including a twelve byte synchronization pattern that identifies the beginning of a sector for read out of the data by the optical pickup and initial data processing circuitry of FIG. 3. A four byte header contains the sector's absolute address, in minutes, seconds, and frames (1 second=75 frames), and a mode byte which indicates in which of the three possible modes the data in the sector are stored. Mode 1 sectors contain 2048 bytes of user data, which constitute bytes 16 to 2068 of the mode 1 sector, which are followed by four bytes of error detection code (EDC) data, eight intermediate bytes, one hundred and seventy-two bytes of P-parity and one hundred and four bytes of Q-parity data. As discussed above, the P-parity bytes and Q-parity bytes make up the error-correction code (ECC). The error detection code (EDC) and error correction code (ECC) make up the two complementary error-protection mechanisms for each CD-ROM sector. The EDC field, which is part of a thirty-two bit cyclic redundant code (CRC) which includes its protected data fields, is used to detect if there are any errors in a sector. The ECC field, which comprises the 172-byte P-parity field and the 104-byte Q-parity field, is a Reed-Solomon Product-like Code (RSPC) used to detect and correct errors within a sector. Thus, the EDC provides a check as to whether any errors exist within a read out sector and the ECC allows the correction of errors within the transferred data. Conventionally, as illustrated in FIG. 1, there has been a implicit presumption that there will be errors present in the data read out from the CD-ROM disk so that all possible ECC operations are performed before any EDC operation is performed. This strategy is capable of correcting errors within transferred data sectors without relying on control circuitry to evaluate whether any particular error correction operation need be performed. On the other hand, the data transfer operations will be slowed by performing error correction operations on data that either did not initially contain errors or has been corrected so that no further errors remain in the data. It is important to note that, while the industry standards for storing and retrieving data stored on CD-ROM disks require both error correction and error detection, the particular structure illustrated in FIG. 1 is not mandated by the standards.

For CD-ROM mode 1 sectors, the EDC codeword consists of bytes 0 to 2067 of a sector, while for CD-ROM XA mode 2 form 1 sectors, the EDC codeword consists of bytes 16 to 2075 of the sector. In EDC calculations the least significant bit of data byte is used first so that the bytes of a sector can be labeled as $B_i$, i=0 to 2351, and a bit of the data byte is $B_{i,j}$, j=7 (MSB) to 0 (LSB). The EDC codeword for a CD-ROM mode 1 sector is the 16544-bit number $$B_{0,0}B_{0,1}B_{0,2}B_{0,3}B_{0,4}B_{0,5}B_{0,6}B_{0,7}B_{1,0}B_{1,1}\ldots B_{2066,6}B_{2066,7}$$
$$B_{2067,1}B_{2067,2}B_{2067,3}B_{2067,4}B_{2067,5}B_{2067,6}B_{2067,7},$$

or in polynomial notation, $$B_{0,0}x^{16543}+B_{0,1}x^{16542}+B_{0,2}x^{16541}+B_{0,3}x^{16540}+\ldots B_{2067,4}x^3+B_{2067,5}x^2+B_{2067,6}x+B_{2067,7}.$$

For a CD-ROM XA mode-2 form-1 sector the EDC codeword is the 16480-bit number $$B_{16,0}B_{16,1}B_{16,2}B_{16,3}B_{16,4}B_{16,5}B_{16,6}B_{16,7}B_{17,0}\ldots B_{2074,7}$$
$$B_{2075,0}B_{2075,1}B_{2075,2}B_{2075,3}B_{2075,4}B_{2075,5}B_{2075,6}B_{2075,7},$$

or in polynomial notation, $$B_{16,0}x^{16479}+B_{16,1}x^{16478}+B_{16,2}x^{16477}+B_{16,3}x^{16476}+\ldots +B_{2075,4}x^3+B_{2075,5}x^2+B_{2075,6}x+B_{2075,7}.$$

For mode 1 data, the EDC protects the sync, header, user data and EDC fields. The four byte EDC field in combination with its protected data fields of sync, header, user data, and EDC fields, for mode 1 data, form the EDC codeword.

Figure 5:
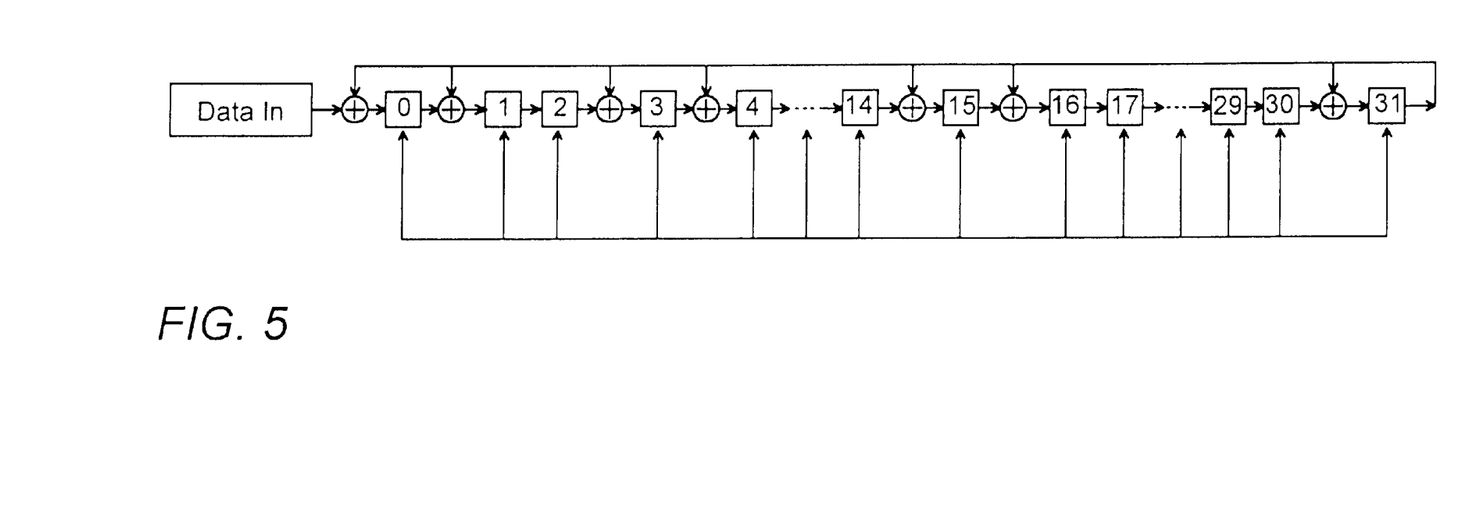
FIG. 5 illustrates a cyclic redundancy check circuit that can be used within the FIG. 6 structure.

According to ISO/IEC-10149, the EDC codeword stored on the CD-ROM disk is made evenly divisible by the check polynomial:

$$P(x)=(x^{16}+x^{15}+x^2+1)\cdot(x^{16}+x^2+x+1) \qquad (1)$$

or $$P(x)=x^{32}+x^{31}x^{16}+x^{15}+x^4+x^3+x+1$$

by choosing the appropriate value for the four EDC bytes appended to the sync, header and user data fields. By dividing the EDC codeword read out from the CD-ROM by the check polynomial and determining whether the remainder from the division is non-zero, the EDC rule can be used to verify whether errors are present in the read out data. The EDC rule can be implemented by a cyclic code decoder as shown in FIG. 5. This circuit might, for example, be implemented as a series of clocked DQ flip-flops with feedback provided through exclusive OR gates connected between successive Q outputs and D inputs. Such circuits are well known. The entire EDC codeword must be fed through the cyclic code decoder as a serial bitstream. After the last bit has entered the cyclic code decoder, the CRC register bits are checked, for example by summing the thirty-two bits of the CRC register. If all bits in the CRC register are zero, the EDC codeword is presumed correct, since the EDC rule did not identify errors in the protected data fields. If a non-zero value is returned from the division, then there must be errors in the protected data fields. The EDC rule cannot, however, tell which bits in the EDC codeword are wrong.

Data correction is accomplished in the transfer of data from a CD-ROM storage disk by the error correction code (ECC), which is preferably a Reed-Solomon Product-like Code (RSPC), applied in a manner similar to that described in the previously incorporated by reference U.S. Pat. No. 4,413,340 to Odaka, et al., and U.S. Pat. No. 4,680,764 to Suzuki, et al. Bytes 12 to 2075 of each sector of data on the mode 1 CD-ROM disk are protected by the double interleaved RSPC code. The protected data bytes of the read out data sector are arranged into a pair of matrices of the type shown in FIG. 2. The columns of the matrix are denoted P-vectors, which are (26, 24) Reed-Solomon codewords over $GF(2^8)$. The diagonals of the matrix are Q-vectors, which are (45, 43) Reed-Solomon codewords over $GF(2^8)$. The sector includes 86 P-vectors and 52 Q-vectors divided between two planes of data, one for the less significant bytes and one for the more significant bytes. The P-vectors and Q-vectors are the basic units for application of the error-correction mechanism. Each P-vector consists of 26 bytes, including 2 parity bytes. A set of error equations can be derived for each of the P-vectors. If there is an error in a P-vector, the error location (i.e., the particular byte of the vector that is erroneous) and the error pattern (i.e., the pattern of error bits within the erroneous byte) may be obtained by solving the set of error equations dictated by application of the Reed-Solomon product-like code rules. If no errors exist in the vector, the error equations have the trivial solution of a zero error pattern. Otherwise, the error equations will provide an error location and an error pattern which is then used to generate a corrected data byte which then replaces the erroneous data in the user data. Q-vectors are forty-five bytes in length, including the two Q-parity bytes. The Reed-Solomon error decoding for the Q-vectors is similar to that performed on the P-vectors. Thus, error equations for each Q-vector are derived and solved to identify erroneous bytes in the Q-vectors and to derive the location and error pattern for the erroneous bytes. The erroneous bytes are then replaced by the correct data pattern derived by the error equations.

Error correction by itself may be insufficiently robust to preserve the integrity of data transferred from the mass storage device. Further error detection processing is necessary after the error correction process because ECC logic has only a limited error correction capability. For each P- or Q-Reed-Solomon vector, only one error can be detected and corrected. Thus, if more than one error exists in a codeword, ECC logic is unable to correctly solve for the error location and error pattern. The result will be either that ECC logic cannot find a legal error location, or it wrongly 'corrects' a byte that actually has no error. Consequently, data processed by ECC logic may not be error free and may, in fact, have new errors introduced by the error correction logic. Some ECC logic implementations can correct two errors per codeword with the error location information supplied by the digital signal processor, but these rules may not provide sufficient additional benefit to merit the additional overhead of the more intricate error correction capability. It is desirable to incorporate both ECC logic and EDC logic, to provide redundant error checking capabilities because error detection logic uses a different approach from the error correction logic to detect errors in a sector. Application of the EDC logic after the error correction process in the conventional CD-ROM storage system is a complementary process which more nearly ensures that the error-corrected sector is free of errors. Of course, this data protection scheme still has limitations, in that only those fields protected by the ECC codes and the EDC codeword are protected.

Figure 6:
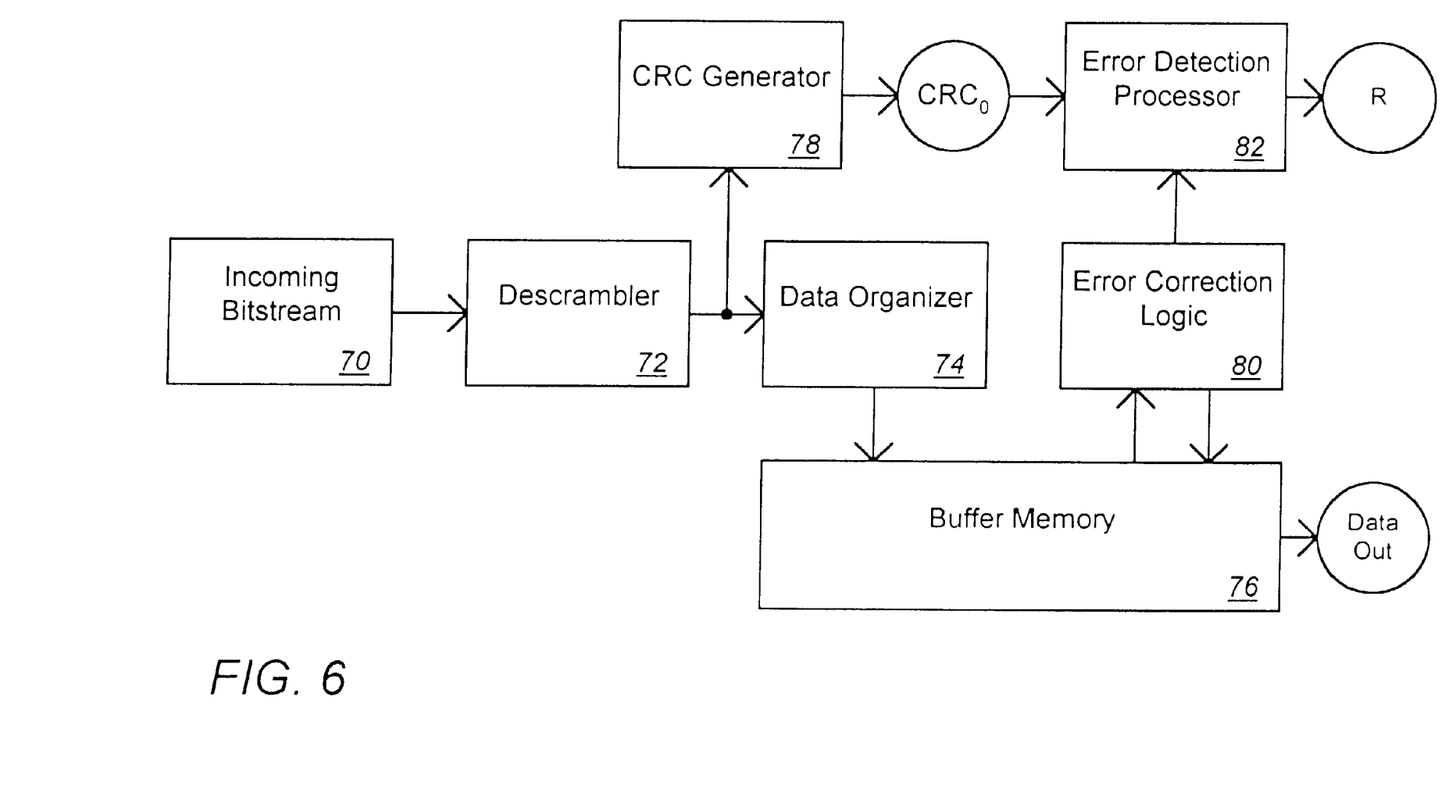
FIG. 6 illustrates a CD-ROM controller in accordance with a preferred embodiment of the present invention.

The functional blocks of a CD-ROM controller in accordance with the present invention are now described with reference to FIG. 6, which provides a different and more detailed view of the CD-ROM controller 58 and buffer memory 66 shown in FIG. 3. Referring now to FIG. 6, the CD-ROM controller receives input data as a bitstream of serial data 70 from the digital signal processor 56 (FIG. 3). The descrambler 72 receives the serialized sector data from the digital signal processor and begins descrambling the serial bitstream after the synchronization pattern passes. Descrambler 72 operates to recover the CD-ROM sector fields (header, user data, EDC, ECC, etc.) following the synchronization field. The descrambled data are provided to data organizer 74 and to CRC generator 78. The data organizer 74 converts the descrambled serial data to bytes, typically eight bit bytes, and stores the data bytes to proper locations in a buffer memory 76 for subsequent error correction operations and eventual transfer to the host computer. Buffer memory 76 is typically chosen to be large enough to readily store one or more sectors of data during transfer operations. The buffer memory 76 may be DRAM or, if higher speeds are desirable, SRAM. An advantage of the present invention is that its higher speed operation allows slower speed, and thus cheaper, memory to be used as a buffer for the data transfer system.

The data bitstream output from the descrambler 72 is provided not only to the data organizer for storage of the data within the buffer memory, but also to the CRC generator 78. The CRC generator 78 is preferably a thirty-two bit cyclic redundancy checker implementing the error check polynomial listed in equation (1) like the CRC illustrated in FIG. 5. The CRC generator receives the incoming data bitstream as the data are initially descrambled by descrambler 72 of the CD-ROM controller. The CRC generator 78 performs an initial error detection operation on the incoming bitstream data, while the data are still being descrambled and stored in memory, by dividing the incoming data bitstream by the error check polynomial. The output from the CRC generator is an initial remainder pattern denoted $CRC_0$, which is the thirty-two bit remainder word resulting from applying EDC logic of the type illustrated in FIG. 5 to an uncorrected incoming EDC codeword bitstream. This $CRC_0$ value is provided to a remainder register within error detection processor 82 after the bitstream corresponding to the entire EDC codeword of the data sector has completely passed through the CRC generator. If the error detection processor detects that the initial error check remainder $CRC_0$ has a zero value, for example by performing a NOR operation on the bits of the $CRC_0$ word, the EDC logic concludes that errors are not present in the incoming data word. In such a case, the error detection processor 82 can cause the data stored within the buffer memory 76 to be immediately output to the data bus of the host computer. In preferred embodiments of this invention, the data of the incoming sector are not again cycled through CRC generator 78, and are not cycled through another CRC generator or otherwise subjected to conventional EDC logic processing. Because conventional EDC logic passes most of the data of a sector serially through a thirty-two bit serial register, conventional EDC logic can be slow. The CD-ROM controller illustrated in FIG. 6 allows for the incoming sector data to pass through EDC logic only once, and that EDC operation is performed at the same time that the incoming data bitstream is being descrambled, organized into bytes and stored into the buffer memory. Accordingly, the time consumed by EDC operations is significantly reduced in accordance with the FIG. 6 embodiment.

In typical embodiments of the FIG. 6 CD-ROM controller, error correction in accordance with the Reed-Solomon Product-like Codes (RSPC) is performed on the data stored in the buffer memory by the error correction logic 80 in the conventional manner, with the exception that error location and error pattern data are retained after the erroneous bytes have been overwritten in the buffer memory 76. Once the data of the transferred sector are stored in the buffer memory 76, error correction begins. The error correction logic 80 fetches the RSPC codewords from the buffer memory, determines if errors are present in the various P- and Q-codewords and, as appropriate, solves the error equations to determine an error location and error pattern for the erroneous data bytes. The error location is a twelve bit binary number generated by error correction logic to point out which byte of a sector is erroneous and the error pattern is an eight bit binary number generated by error correction logic to indicate which bits of a byte should be corrected. In preferred implementations of the FIG. 6 controller, the error location is simply the address of an erroneous byte. Error patterns are used in conjunction with their associated error locations during the error correction process. For example, if the error pattern=$01001010_2$ and the error location is $1234_{10}$, then byte $1234_{10}$ of the sector data is erroneous. Furthermore, if the original value of byte $1234_{10}$ is $11010101_2$ then the value of byte $1234_{10}$ is corrected to $11010101_2 \oplus 01001010_2 = 10011111_2$, i.e., correct value=original data pattern$\oplus$error pattern, where $\oplus$ is the exclusive-OR operator. ECC logic 80 performs error correction on the respective P- and Q-codewords by calculating the corrected data byte (correct data=error data$\oplus$error pattern) and then overwriting the erroneous data byte with the corrected data byte in the buffer memory 76.

The error location and error pattern, in preferred embodiments of the present invention, are not discarded after the error byte has been corrected. Rather, the error location and the error pattern are saved in a register within the error correction logic 80 or, more typically, within the error detection processor 82. These data are used for calculating a correction to the initial error check remainder $CRC_0$, or for calculating a further correction to a previously corrected error check remainder $R_i$. After each correction to the data stored in the buffer memory, the value of the error check remainder $R_i$ is checked to determine if it is zero. If a zero value is present in the latest iteration of the remainder $R_i$, the error detection processor 82 can conclude that all errors within the sector have been corrected and that the data are ready to be transferred from the buffer memory 76 to the IDE or other bus of the host computer. When the FIG. 6 CD-ROM controller is operated in this manner, operation of the error correction logic 80 is halted after a zero value is returned for the error check remainder $R_i$.

The error detection processor 82 applies the error detection code rule of the present invention to the data stored within the buffer memory indirectly, applying the invention's EDC rule on the basis of the error location and error pattern information generated by operation of the error correction logic to the initial or a subsequent CRC remainder value ($CRC_0$ or $R_i$) to produce an updated CRC remainder value ($R_{i+1}$). For each error byte corrected by the error correction logic 80, the error correction logic 80 passes the error location and error pattern information to the error detection logic 82. The error detection logic 82 recalculates the CRC remainder R from the check polynomial division by calculating a correction to the remainder and adding that correction to the previously stored remainder ($R_i$). By calculating a correction to the CRC remainder, the error detection logic does not have to divide the long binary number consisting of the bits of all of the sector data protected by the EDC by the check polynomial to calculate the CRC remainder. After the error detection processor 82 corrects the remainder $R_i$ in accordance with the error location and error pattern of the byte most recently corrected by the error correction logic 80, the new value of the error detection register R is checked. If R is non-zero, errors remain to be corrected within the sector's data, and the error correction process continues. If R is zero, the error detection processor preferably assumes that all errors in the sector have been corrected and the error correction process is preferably stopped and the data are transferred. A new sector is read from the CD-ROM storage disk and the processes described above are repeated for the next sector. If, after all P-vectors and Q-vectors of a sector have been processed, R remains non-zero, the error correction process can repeated again or, more preferably, the sector's data are read from the disk again.

Operation of the error detection processor of the present invention can be understood by reference to a simplified example based on a 15 bit codeword $$c(x)=x^{14}+x^{11}=x^{x8}=x^6=x^5=x^4=x^3=x, \text{ or}$$

$$c(x)=(100100101111010),$$

which has the check polynomial $$p(x)=x^4x+1.$$

Dividing p(x) into c(x) produces the quotient $$q(x)=(10001011001),$$

with a remainder r(x)=(0001) as follows:

```
                    10001011001      q(x)
         p(x) 10011 )100100101111010 c(x)
                    10011
                    -----
                     10101
                     10011
                     -----
                      11011
                      10011
                      -----
                       10001
                       10011
                       -----
                        10010
                        10011
                        -----
                         0001   remainder
```

This represents a conventional application of error correction logic to verify the integrity of code word c(x) using the error check polynomial p(x), such as might be performed initially by the CRC generator 78 of FIG. 6. Of course, the EDC codeword used in the CRC generator 78 is over sixteen thousand bits in length and the error check polynomial is the one listed in equation (1) above. This example also illustrates the simplicity of the division operation of a conventional CRC operation, since it is accomplished by modulo 2 arithmetic and may be implemented in serial shift registers in combination with XOR gates. Since the remainder r(x) is non-zero in the above example, the EDC operation indicates that there is an error in the code word c(x). Some form of an error correction operation can then be performed which determines that the erroneous bits of the codeword c(x) are $x^{10}$ and $x^5$ so that the error pattern for c(x) is e(x)= (000010000100000). The corrected codeword c'(x) is then given by c'(x)=c(x)⊕e(x)=(1001101010011010).

The fact that c'(x) is correct can be demonstrated by application of conventional EDC logic after the error correction operation in the manner practiced by the conventional error correction and error detection circuitry of FIG. 1, as follows:

$$
\begin{array}{r}
10000010110 \quad q(x) \\
p(x) \; 10011 \overline{)100110101011010} \quad c'(x) \\
\underline{10011}\phantom{0000000000} \\
10101\phantom{0000000} \\
\underline{10011}\phantom{0000000} \\
11010\phantom{00000} \\
\underline{10011}\phantom{00000} \\
10011\phantom{000} \\
\underline{10011}\phantom{000} \\
0000 \quad \text{remainder}
\end{array}
$$

As discussed previously, while this conventional EDC procedure (CRC after ECC completion) has the advantage of hardware simplicity, it can be a slow process when applied to the sixteen thousand bit EDC codeword conventionally utilized in the storage of data on CD-ROM disks.

Preferred embodiments of the invention correct the error check remainder from the error pattern, and the corrected remainder is tested to determine when it reaches zero. As illustrated in the following calculation, the method provides similar results to the conventional process:

$$
\begin{array}{r}
1001111 \quad q(x) \\
p(x) \; 10011 \overline{)10000100001} \quad e(x)+r(x) \\
\underline{10011}\phantom{000000} \\
11100\phantom{0000} \\
\underline{10011}\phantom{0000} \\
11110\phantom{000} \\
\underline{10011}\phantom{000} \\
11010\phantom{00} \\
\underline{10011}\phantom{00} \\
10011 \\
\underline{10011} \\
0000 \quad \text{remainder}
\end{array}
$$

The present error detection processor incrementally tracks the corrections made to the error check remainder, decrements the remainder value by the corrections and determines when the error check remainder is reduced to zero. Thus, the remainder is fully corrected through the subtraction from the original error check remainder of one or more numbers, the sum of which are equal to the original error check remainder. Equivalently, the sum of the original remainder pattern and the error patterns of each of the corrections made to the sector data is evenly divisible by the error check polynomial, in the manner illustrated in the preceding example. Thus, the error correction method of the present provides a similar check of data integrity to the conventional CRC-based EDC logic, but the implementation of this error detection process is quite different from that of the conventional, CRC-based error detection logic.

In the example above, the error patterns consisted of single bits to be placed at specific locations within the code word. By contrast, when the error detection processor of the present invention is implemented in a CD-ROM controller, the error pattern is an eight bit byte, and the error location is a twelve bit number that identifies the location of the erroneous byte within the over two thousand bytes of the sector. To calculate the correction to the error check remainder, it is necessary to compensate for the error position on the basis of both the error pattern and the error location. Mathematically, the error detection processor 82 of the FIG. 6 embodiment performs the following calculation to correct the most recent error check remainder $$R_{i+1}=R_i \oplus \{(e \cdot x^{8\lambda}) \bmod{P(x)}\}, \quad (2)$$

where R is the error detection result, e is the error pattern, $\lambda$ is a number derived from the error location l, and P(x) is the check polynomial as set forth in equation (1). In practice, the number $R_i \oplus (e \cdot x^{8\lambda})$ can be long, so that the modulo P(x) operation can take time. The calculation is, however, faster than the conventional CRC calculation performed on an entire EDC word. In addition, this error detection processing is performed in parallel with the error correction processing, so that the complete error correction and error detection process is performed faster overall than in the conventional circuit shown in FIG. 1.

Figure 7:
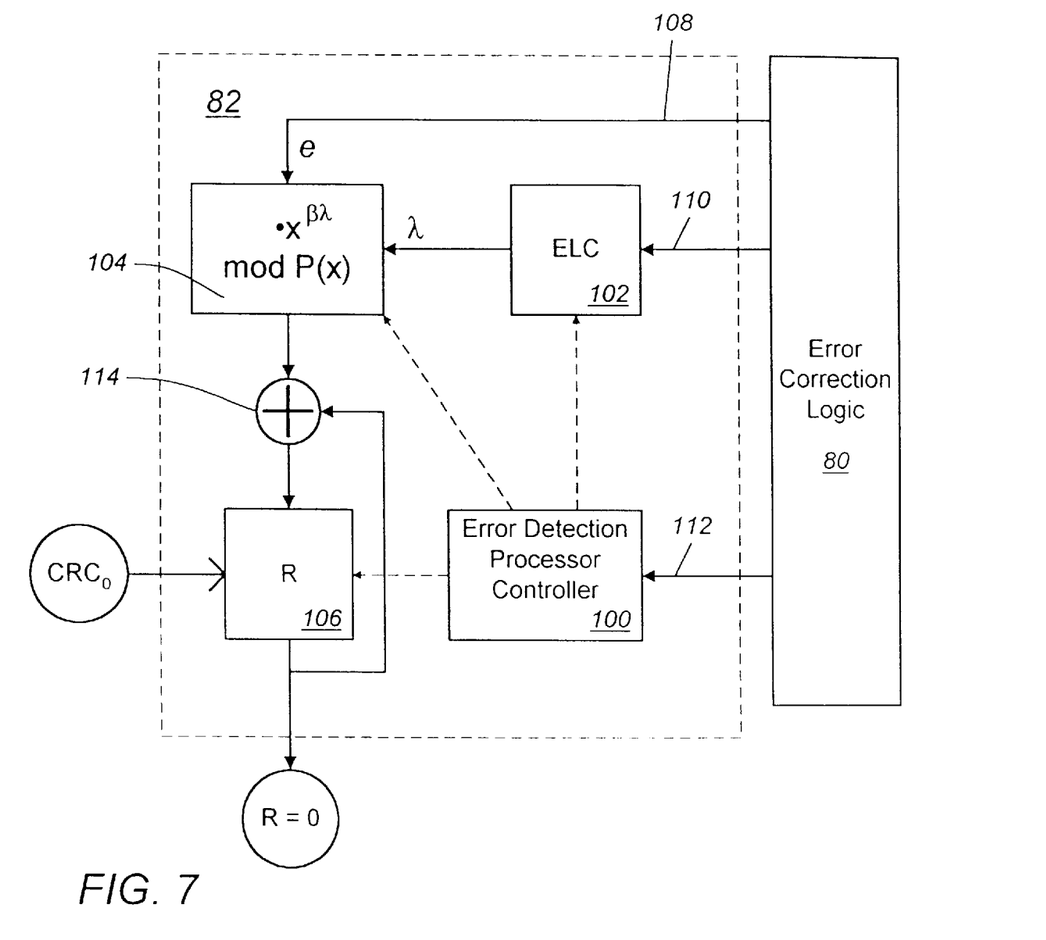
FIG. 7 illustrates an error detection processor in accordance with the present invention.

FIG. 7 schematically illustrates one possible error detection processor 82 that implements the calculation of equation 2 within the CD-ROM controller of FIG. 6. The error detection processor 82 includes an error detection processor controller 100 which is a state machine for controlling the sequence of steps included in the calculation of a correction to the error check remainder. Error location converter 102, or ELC in FIG. 7, converts the error location l to the 12-bit number $\lambda$, which is then used in the calculation of corrections to the value R. Correction calculation circuit 104 calculates the value $(e \cdot x^{8\lambda}) \bmod P(x)$ and outputs the remainder correction. The remainder R register 106 stores the error check remainder, which is initially $CRC_0$ and in subsequent iterations is the corrected remainder value $R_i$. The error pattern e (eight bits) and the error location l are generated by error correction logic 80 when it successfully solves a set of error equations. Error correction logic 80 outputs the error pattern e and the error location l to the error detection processor 82 on lines 108 and 110, respectively. At the same time, the error correction logic outputs a start pulse on line 112 that initiates operation of the error detection processor, that is, the state machine controlled by the error detection processor controller 100 begins stepping through the error detection processing steps.

The other input to the error detection processor 82 is the initial $CRC_0$ value calculated by the CRC generator circuit 78 of the FIG. 6 controller circuit. This initial $CRC_0$ value is typically provided to the error detection processor by the CRC generator before or contemporaneous with the initiation of the error correction processing and is stored in the R register 106. The value of initial error check remainder $CRC_0$ is checked to determine if it is zero. If the initial value is zero, preferred embodiments of the present invention perform no further error correction operations. In the case that the initial EDC operation by the CRC generator indicates that there is one or more errors within the read in data, the $CRC_0$ value remains in the R register 106 until the error correction logic initiates operation of the error detection processor 82. Upon initiation by the start pulse, the error location converter 102 converts the error location l to the twelve bit number λ, which is then provided to the correction calculation circuit 104. The correction calculation circuit is also provided with the error pattern e and from these data, the correction calculation circuit 104 calculates a correction to the initial remainder value. XOR gates 114 sum the thirty-two bit error check remainder word with the correction value, which is then stored in the R register. Upon generation of a corrected remainder, the value of the remainder is tested by, for example, a NOR operation applied to all of the bits of the remainder word. If the remainder is zero, then all errors are presumed corrected and the data stored in the buffer memory may be immediately transferred or may be later transferred upon a request by the host computer. After error correction operations have successfully corrected one sector's data, a new sector is read from the mass storage unit, and error correction and error detection processing begins again. If on the other hand the corrected remainder remains non-zero, error correction processing continues. If all error correction vectors have been processed once, it is possible to continue error correction processing by repeating the decoding of the previously decoded P- and Q-vectors. More preferably, however, the sector's data are read from the disk again and the entire error correction and detection process begins again.

The CRC generator derives the initial CRC value $CRC_0$ by dividing the EDC codeword of a sector by P(x) before the error correction operations begin. Given a CD-ROM mode 1 sector whose data bytes are $B_i$, i=0 to 2351, $$(B_{0,0}x^{16543}+B_{0,1}x^{16542}+ \ldots +B_{2067,6}x+B_{2067,7}) \div P(x) = Q_0(x) + \ldots + CRC_0(x)$$

where P(x) is the check polynomial and $Q_0(x)$ is the quotient. The error correction logic solves for an error pattern e and location l of the erroneous byte and then corrects the codeword. The corrected EDC codeword becomes $$B_{0,0}x^{16543} \ldots +(B_{L,0}x^7+B_{L,1}x^6+B_{L,2}x^5+B_{L,3}x^4+B_{L,4}x^3+B_{L,5}x^2+B_{L,6}x+B_{L,7})x^{8(2067-l)}+ \ldots +B_{2067,7}+(e_0x^7+e_1x^6+e_2x^5+e_3x^4+e_4x^3+e_5x^2+e_6x+e_7)x^{8(2067-l)}.$$

where $e_i$, i=7 (MSB) to 0 (LSB) are the bits of the error pattern e. Dividing P(x) into the above EDC codeword provides the remainder $$R(x)=CRC_0(x)+r(x),$$

where $$r(x)=(e_0x^7+e_1x^6+e_2x^5+e_3x^4+e_4x^3+e_5x^2+e_6x+e_7)x^{8(2067-l)} \text{ modulo } P(x).$$

The correction calculation circuit 104 shown in FIG. 7 performs the above calculation of r(x). Since more than one error may be corrected during the error correction process, this calculation may be performed as many times as errors are corrected by the error correction logic 80. Except for the very first correction to the remainder, which operates on the initial $CRC_0$ value, all of the error detection processor iterations operate on an R(x) determined by $$R(x)_{(new\ value)}=R(x)_{(old\ value)}+r(x).$$

Note that the equations described above can be applied to CD-ROM XA mode 2, form 1 sectors with minor modifications. Thus, the error detection processor 82 detects errors by calculating new R values according to the formula:

$$R(x)_{new}=R(x)_{old}+\{(e \cdot x^{8(L-l)}) \text{modulo } P(x) \},$$

where e is the error pattern, l is the error location, and L=2067 for CD-ROM mode 1 sectors, or 2075 for CD-ROM XA mode 2, form 1 sectors.

Figure 8:
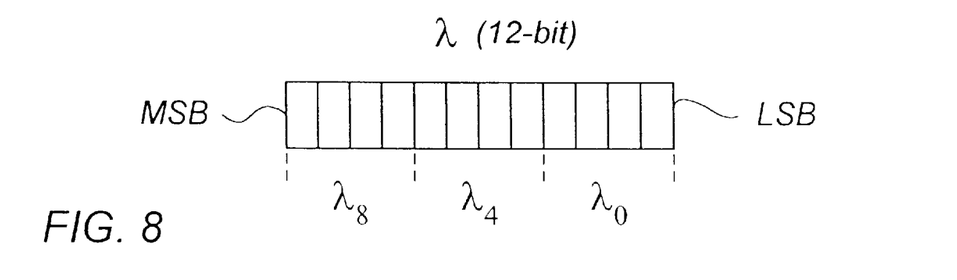
FIG. 8 illustrates a counter that can be used in conjunction with preferred embodiments of the present invention.

As l is a 12-bit number, direct computation of $e \cdot x^{8(L-l)}$ modulo P(x) will frequently be undesirable as requiring too significant of a hardware commitment and thus too much chip real estate. It is therefore preferable to break the computation into a number of smaller multiplication operations. The calculation of the remainder can thus be rewritten as:

$$R(x)_{new}=R(x)_{old}+\{(e \cdot x^{8\lambda}) \text{modulo } P(x)\},$$

where $\lambda=(L-l)$. The 12-bit number λ can then be decomposed into three 4-bit parts, i.e., $\lambda=\lambda_8 \cdot 2^8+\lambda_4 \cdot 2^4+\lambda_0$, as shown in FIG. 8. This transformation makes the error pattern calculation as follows:

$$e \cdot x^{8\lambda} = e \cdot x^{8(256\lambda_8+16\lambda_4+\lambda_0)}.$$

$$= e \cdot x^{2048\lambda_8+128\lambda_4+8\lambda_0}.$$

$$= e \cdot (x^{2048\lambda_8} \times x^{128\lambda_4} \times x^{8\lambda_0}).$$

Thus, $$e \cdot x^{8\lambda} \text{ modulo } P(x) = e \cdot (x^{2048\lambda_8} \times x^{128\lambda_4} \times x^{8\lambda_0}) \cdot \text{modulo } P(x).$$

Figure 9:
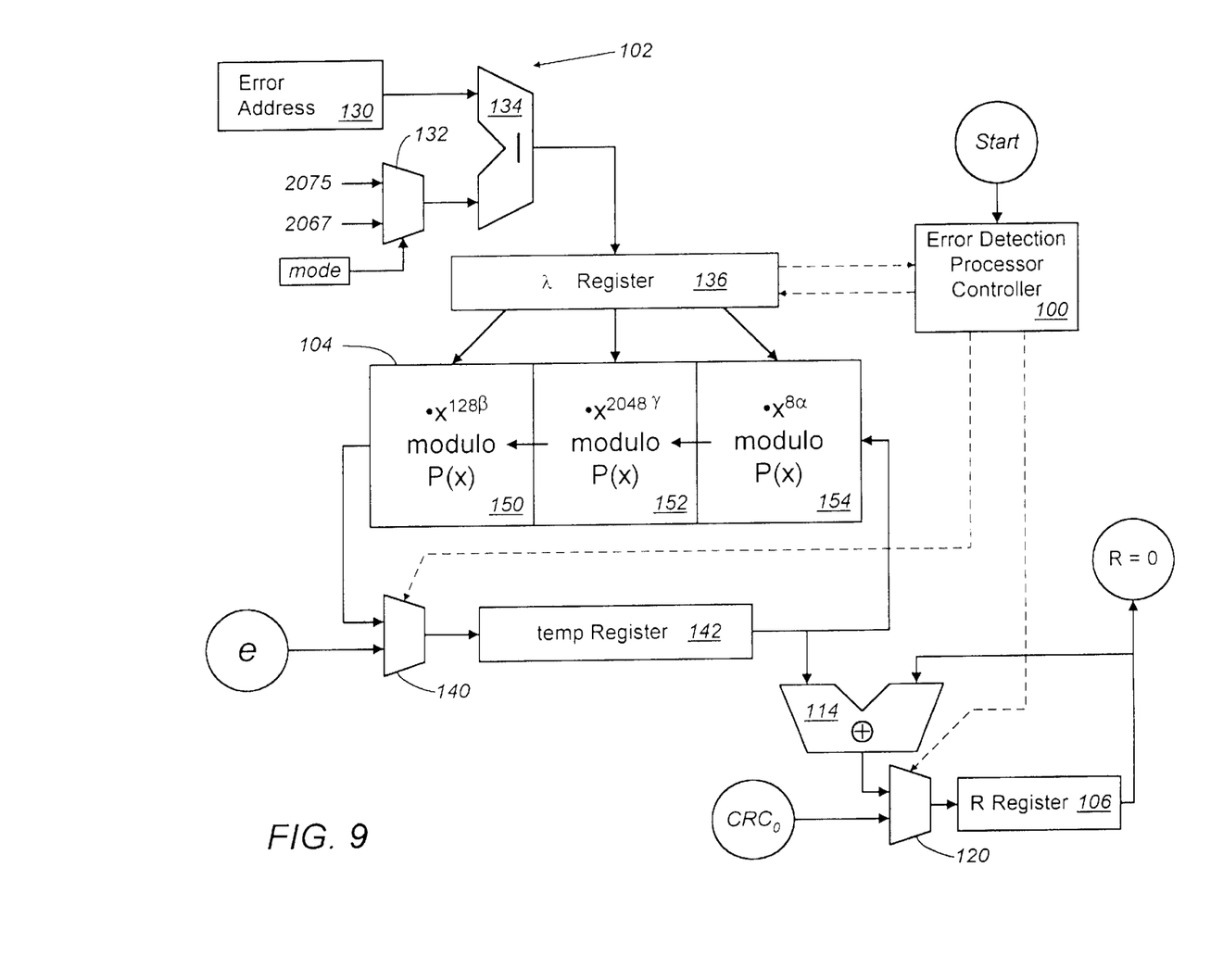
FIG. 9 illustrates another embodiment of an error detection processor in accordance with the present invention.

This equation can be expanded out using the rule $$(A \times B) \text{modulo } N = \{(A \text{ modulo } N) \times B\} \text{modulo } N$$

for a full product representation of the remainder correction calculation. The remainder correction calculation $e \cdot x^{8\lambda}$ modulo P(x) can be computed by applying the $\cdot x^{2048}$ modulo P(x) (multiply by $x^{2048}$, then divide by P(x) to obtain the remainder) operator $\lambda_8$ times, the $\cdot x^{128}$ modulo P(x) operator $\lambda_4$ times, and the $\cdot x^8$ modulo P(x) operator $\lambda_0$ times. In a particularly preferred embodiment of an error detection processor in accordance with the present invention, shown in FIG. 9, the remainder correction computations are implemented with a 3-stage polynomial multiplier 104 having stages 150, 152 and 154 and a λ counter 136.

The error detection circuit is in many respects similar to the embodiment illustrated in FIG. 7. Further discussion of already described elements is thus limited. As with the FIG. 7 embodiment, the FIG. 9 error detection processor stores the thirty-two bit $CRC_0$ initial error check remainder directly from the CRC generator 78 (FIG. 6) as an initial value in R register 106. In this initial state, the multiplexer 120 is held in a state that selects the output of the CRC generator. Each time the error correction logic 80 finds an error and successfully solves the appropriate error equations to generate an eight bit error pattern e and a twelve bit error location l, the error correction logic provides a start pulse to the error detection processor controller 100. At this time, the error correction logic also provides the error pattern e and the error location l to the error detection processor. On reception of the start pulse, the error pattern input value is passed through the multiplexer 140 and latched to the temp-register 142 for later calculations.

Also on reception of the start pulse, the portions of the FIG. 9 error detection processor which correspond to the ELC circuit 102 of the FIG. 7 embodiment convert the twelve bit input error address 130 to a value λ and stores the value in the λ register 136. λ is determined on the basis of both the mode of CD-ROM sector in which the data are stored, which determines the length of the EDC codeword, and the location of the erroneous byte within the EDC codeword. The mode read from the CD-ROM disk causes the multiplexer 132 to output one or the other of EDC codeword lengths (2067, 2075) appropriate to the different modes as a twelve bit binary word. If the mode byte is read as =1, the sector is stored as CD-ROM mode 1 data, so the multiplexer 132 selects a subtrahend of 2067. Otherwise, a subtrahend of 2075 is selected corresponding to CD-ROM XA mode 2, form 1 sectors. Twelve bit subtractor 134 subtracts the twelve bit error address from the twelve bit EDC codeword length and provides the result to the $\lambda$ register 136. The $\lambda$-register 136 consists of three 4-bit counters $\lambda_8$, $\lambda_4$ and $\lambda_0$, shown in greater detail in FIG. 8, which generates three signals $\gamma$, $\beta$, and $\alpha$:

$$\alpha=(\lambda_0 \neq 0), \beta=(\lambda_4 \neq 0), \text{ and } \gamma(\lambda_8 \neq 0).$$

$\alpha$, $\beta$, and $\gamma$ control the '$\cdot x^8$ modulo $P(x)$', '$x^{128}$ modulo $P(x)$', and '$\cdot x^{2048}$ modulo $P(x)$' stages respectively.

Three stage multiplier 104 calculates the remainder correction $e \cdot x^{8\lambda}$ modulo $P(x)$ the following algorithm performed on the error pattern previously stored within the temp register:

```
while (λ ≠ 0)
{
    temp = {{{temp · x^8α modulo P(x)} · x^2048γ modulo P(x)} · x^128β modulo P(x)};
    if (λ_8 > 0) then λ_8 = λ_8 − 1;
    if (λ_4 > 0) then λ_4 = λ_4 − 1;
    if (λ_0 > 0) then λ_0 = λ_0 − 1;
}.
```

The total number of cycles required is the maximum of ($\lambda_8$, $\lambda_4$, $\lambda_0$) and the result of the multiplication is provided through multiplexer 140 to the temp register 142. Note here that the order of the three multiplication/modulo operations performed by the three stages 150, 152 and 154 has no effect on the final result produced by the correction calculation circuit and stored in the temp register 142, but the illustrated arrangement optimizes hardware characteristics, including reducing the amount of chip area consumed by the multiplier/modulo circuits and so represents a preferred aspect of the present invention. After the requisite number of cycles performed by the multiplier 104, the temp register 142 contains the value of the remainder correction $e \cdot x^{8\lambda}$ modulo $P(x)$. The remainder value is then added using the exclusive-OR gates 114 to the value ($CRC_0$ or $R_i$) stored in the R-register 106. The multiplexer 120 selects the output of the XOR gates 114 for all error correction operations after the error detection processor is initialized.

The status of the corrected remainder R can be obtained from the R=0 output. Depending on the value of the corrected remainder, as discussed above with respect to the FIG. 7 embodiment, either data will be transferred or further error correction operations will be performed.

While the present invention has been described in terms of certain preferred embodiments thereof, these preferred embodiments are intended as examples only. Those of ordinary skill in the art will appreciate that variations and modifications can be made to the embodiments described herein without varying from the fundamental teachings of the present invention. Accordingly, the present invention is not to be limited to the particular embodiments described herein. Rather, the scope of the present invention is defined by the claims which follow.

What is claimed:

1. A method of transferring data between an optical disk mass storage system and a host computer, the method comprising the steps of:

retrieving a data string from the digital storage system and converting the retrieved data string to a form compatible with storage in a digital memory;

providing the retrieved and converted data string into a buffer memory for storage therein, while concurrently providing the retrieved data string to a first error detection circuit;

performing a first error detection operation with the first error detection circuit on the retrieved data string to determine if any errors exist within the retrieved data string, with at least a portion of the error detection operation performed while the retrieved data string is being stored into the buffer memory;

transferring the retrieved and converted data string from the buffer memory to the host computer system if the first error detection operation determines that no errors are present in the retrieved data string; and performing an error correction operation on the retrieved data string if the first error detection operation determines that errors are present in the retrieved data string prior to transferring the retrieved data string to the host computer.

2. The method of claim 1, further comprising the following steps when the error correction operation is performed:

correcting an error within the retrieved data string;

performing a second error detection operation to determine if additional errors remain within the retrieved data string, the second error detection operation generating a no error signal if the second error detection operation indicates that no uncorrected errors remain within the retrieved data string; and providing the corrected data string to the host computer in response to the no error signal generated by the second error detection operation.

3. The method of claim 2, wherein the step of performing the first error detection operation produces a first error detection value which is characteristic of the errors present in the retrieved data string, the first error detection value being stored.

4. The method of claim 3, wherein the step of performing the second error detection operation comprises the steps of calculating a correction to the first error detection value, correcting the first error detection value and determining whether the corrected error detection value is non-zero.

5. The method of claim 4, wherein the first error detection operation includes dividing the retrieved data string by an error check polynomial and wherein the first error detection value is a remainder calculated by dividing the retrieved data string by the error check polynomial.

6. The method of claim 5, wherein the second error detection operation is responsive to an error pattern and an error location derived by the error correction operation.

7. The method of claim 1, wherein the step of converting the retrieved data string includes operations performed by a digital signal processor and operations performed by a descrambler.

8. The method of claim 7, wherein the descrambler provides data to the first error detection circuit and to a data organizer which stores the retrieved data string into the buffer memory.

9. The method of claim 8, wherein the retrieved data string is encoded with a double interleaved Reed-Solomon code.

10. The method of claim 1, wherein the first error detection circuit is a cyclic redundancy code checker.

11. The method of claim 1, wherein the error correction operation identifies the first error in the retrieved and converted data string with a Reed-Solomon code decoder.

12. The method of claim 1, wherein the error correction operation includes adding an error pattern to erroneous data.

13. The method of claim 1, wherein the first error detection operation determines the existence of one or more errors in the retrieved data string, using the error detection circuit, and wherein the error correction operation includes identifying and correcting errors in the data stored in the buffer memory using an error correction circuit, only after the error detection operation determines the existence of one or more errors in the retrieved data string.

14. A method of transferring data between an optical disk mass storage system and a host computer, the method comprising the steps of:

retrieving a data string from the optical storage disk and storing the retrieved data string into a buffer memory;

concurrently with said storing, providing the retrieved data string to a first error detection circuit;

transferring the retrieved data string out of the buffer memory if the first error detection operation determines that no errors are present in the retrieved data string, if any errors exist with the retrieved data string, then performing a first error detection operation on the retrieved data string to determine if errors exist within the retrieved data string and determining a first error detection value characteristic of the errors present within the retrieved data string;

performing an error correction operation on the retrieved data string, identifying a first error in the retrieved data string and determining an error pattern for the first error;

correcting the first error in the retrieved data string; and performing a second error detection operation to determine if errors remain in the corrected data string.

15. The method of claim 14, wherein the step of performing a second error detection operation includes calculating a correction to the first error detection value on the basis of the error pattern determined for the first error.

16. The method of claim 15, further comprising the steps of correcting the first error detection value and storing the corrected first error detection value as a second error detection value and then determining whether the second error detection value is non-zero.

17. The method of claim 16, wherein the second error detection value is determined by a second error detection circuit distinct from the first error detection circuit.

18. The method of claim 16, further comprising the step after the error correction operation is performed, of providing the corrected data string to the host computer.

19. The method of claim 14, wherein the retrieved data string is provided to the first error detection circuit while the retrieved data string is being stored in the buffer memory.

20. The method of claim 14, further comprising the step of transferring the retrieved data string to the host computer system if the first error detection operation determines that no errors are present in the retrieved data string.

21. The method of claim 14, wherein no error correction operation is performed until after the first error detection value is stored.

22. The method of claim 14, wherein the first error detection operation includes dividing the retrieved data string by an error check polynomial and wherein the first error detection value is a remainder calculated by dividing the retrieved data string by the error check polynomial.

23. The method of claim 22, wherein the second error detection operation is responsive to an error pattern and an error location derived by the error correction operation.

24. The method of claim 14, wherein the retrieved data string is encoded with a double interleaved Reed-Solomon code.

25. The method of claim 14, wherein the first error detection operation is performed with a cyclic redundancy code checker.

26. The method of claim 14, wherein the error correction operation identifies the first error in the retrieved and converted data string with a Reed-Solomon code decoder.

27. The method of claim 14, wherein the error correction operation includes adding an error pattern to erroneous data.

28. The method of claim 14, wherein the error detection operation determines the existence of one or more errors in the retrieved and converted data string, using the error detection circuit, and wherein the error correction operation includes identifying and correcting errors in the data stored in the buffer memory using an error correction circuit, only after the error detection operation determines the existence of one or more errors in the retrieved and converted data string.

* * * * *